UNITED STATES PATENT OFFICE.

JOHN C. TATE, OF OAKLAND, CALIFORNIA.

ABSORBING AND PURIFYING COMPOSITION.

1,346,349.     Specification of Letters Patent.     Patented July 13, 1920.

No Drawing.     Application filed September 21, 1916. Serial No. 121,482.

*To all whom it may concern:*

Be it known that I, JOHN C. TATE, a citizen of the United States, residing at Oakland, in the county of Alameda and State of California, have invented certain new and useful Improvements in Absorbing and Purifying Composition, of which the following is a specification.

The present invention relates to an absorbent composition, particularly adapted for purifying the gaseous products resulting from the combustion of fuel gas or the lighter oils, such for example as kerosene.

It is well known that the exhaust gases from gas or oil flames contain objectionable products, chief among which are water vapor and carbon dioxid. Small proportions of other gases, particularly compounds of sulfur, are also frequently present, and give rise to disagreeable odors. And moreover, the water vapor, combining to a certain degree with the carbon dioxid and the sulfurous gases, produces corrosive acidic compounds. These exhaust products are not only injurious to health, if present in the air in sufficient quantities, but they also attack and corrode metals, painted surfaces, and organic materials.

The object of the present invention therefore, is to provide a composite material which will absorb, wholly or in part, the injurious and objectionable constituents from the exhaust gases of gas and oil flames, and by so doing to permit the use of such flames, as for example in heaters and stoves, in confined spaces, without necessitating the provision of vents or flues for carrying off the products of combustion.

My absorbent composition is intended to be inclosed within a suitable container through which the exhaust gases are passed in such a manner that they come in contact with the absorbent material. For example, a container having a supply of my absorbent composition may be attached to a heating stove, and the exhaust gases thereof passed through said container before being discharged into the air. Such a stove may be used in a closed room, without rendering the air thereof unfit for breathing, for a very much longer time than is possible without the use of the absorbent composition. It is to be understood that the absorbent composition is to be renewed when saturated beyond the point of efficient absorption.

My composition consists of a mixture of a mineral absorbent, such, for example as lime, preferably air-slaked, a vegetable absorbent such as charcoal, and a mineral binder and filler, such as freshly burned gypsum. A small quantity of clay, such for example as kaolin may also be included, as an additional absorbent. These ingredients are preferably mixed in the following approximate gravimetric proportions, although variations in said proportions, within reasonable limits, are permissible without affecting the efficiency of the composition: lime 16 parts; charcoal, preferably wood charcoal, 1 part; burned gypsum, 8 parts; and kaolin, 4 parts.

The above ingredients are preferably powdered, and mixed in a dry state. To the dry mixture is then added approximately seventy-five per cent. (by weight) of water, to form a plastic mass. The plastic mass thus formed is molded into bodies preferably spherical in form and approximately three-quarters of one inch in diameter, and subsequently dried, by any convenient means, to expel the admixed water. When dry, the balls are hard and porous.

The lime in my composition acts as an absorbent of water vapor and carbon dioxid. The kaolin, if used, acts as a mechanical absorbent, and as a deodorant. The burned gypsum serves as a binder, to hold the other ingredients together in a hard mass, and is of itself sufficiently porous to act as a mechanical absorbent.

The spherical form of my composition, which I consider preferable to the other forms, prevents the individual pieces from lying too close together in the container, and enables the greatest possible area of surface to be exposed to the gases; and the composition, being hard and in regular pieces, is clean and easy to handle.

Having thus described my invention, what I claim as new and desire to protect by Letters Patent is:—

1. A composition for purifying gaseous products of combustion comprising a mineral capable of absorbing moisture and carbon dioxid, a vegetable material capable of absorbing gaseous fumes, and a binder.

2. A composition for purifying gaseous products of combustion comprising a mineral capable of absorbing moisture and carbon dioxid, in combination with charcoal, and a binder.

3. A composition for purifying gaseous products of combustion comprising lime, charcoal, and a binder.

4. A composition for purifying gaseous products of combustion comprising lime, kaolin, charcoal and a binder.

5. A composition for purifying gaseous products of combustion comprising a mixture of lime, charcoal and burned gypsum.

6. As a composition for purifying gaseous products of combustion, a hard porous material comprising a mixture of lime, charcoal, and burned gypsum.

7. A composition for purifying gaseous products of combustion comprising a hard porous mass consisting of a mineral capable of absorbing moisture and carbon dioxid, a vegetable material capable of absorbing gaseous fumes, and a binder.

8. As a composition for purifying gaseous products of combustion, a hard porous body of spherical form consisting of a mixture of lime, kaolin, charcoal, and burned gypsum.

9. A composition for purifying gaseous products of combustion, comprising a mixture of 16 parts by weight of lime, one part by weight of wood charcoal, and 8 parts by weight of burned gypsum.

10. A composition for purifying gaseous products of combustion, consisting of 16 parts by weight of lime, 4 parts by weight of kaolin, one part by weight of wood charcoal, and 8 parts by weight of burned gypsum.

11. A composition for purifying gaseous products of combustion comprising an absorbent capable of retaining moisture, gases, and the disagreeable odors resulting from combustion of animal and vegetable matter.

12. A composition for purifying gaseous products of combustion comprising a hard porous body of spherical form composed of a mineral capable of absorbing moisture and carbon dioxid, a vegetable material capable of absorbing gaseous fumes, and a binder.

13. A composition for purifying gaseous products of combustion comprising lime, clay, charcoal and a binder.

14. As a composition for purifying gaseous products of combustion, a porous body consisting of a mixture of lime, clay, charcoal, and burned gypsum.

15. A composition for purifying gaseous products of combustion, consisting of substantially 16 parts of lime, 4 parts of clay, 1 part of charcoal, and 8 parts of burned gypsum.

16. A process of purifying the products of combustion caused by the burning of liquid or gaseous fuel, consisting of passing said products of combustion in a continuous stream in their natural flow prior to their escape to the atmosphere through a porous composition made of a mineral capable of absorbing moisture and carbon dioxid, and a vegetable material capable of absorbing gaseous fumes.

17. A process of purifying the products of combustion caused by the burning of liquid or gaseous fuel, consisting of passing said products of combustion in a continous stream in their natural flow prior to their escape to the atmosphere through a porous mixture of hydrated lime, potter's clay, charcoal and a binder, which absorb and retain the noxious vapors in said products of combustion.

18. A process of purifying the products of combustion caused by the burning of liquid or gaseous fuel, consisting of passing the products of combustion in a continuous stream in their natural flow prior to their escape to the atmosphere, in a highly heated condition through porous composition, consisting of a mixture of twenty parts of hydrated lime, two parts of potter's clay, nine parts plaster Paris, and one part of wood charcoal.

In testimony whereof I have signed my name to this specification in the presence of a subscribing witness.

JOHN C. TATE.

Witness:
D. B. RICHARDS.